(12) United States Patent
Yang

(10) Patent No.: US 9,524,066 B2
(45) Date of Patent: Dec. 20, 2016

(54) SINGLE LAYER CAPACITIVE TOUCH SENSOR

(71) Applicant: PIXART IMAGING INC., Hsin-Chu County (TW)

(72) Inventor: Kuan-Yi Yang, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 0 days.

(21) Appl. No.: 14/311,492

(22) Filed: Jun. 23, 2014

(65) Prior Publication Data

US 2015/0022734 A1  Jan. 22, 2015

(30) Foreign Application Priority Data

Jul. 17, 2013 (TW) .............................. 102125675 A

(51) Int. Cl.
*G06F 3/044* (2006.01)
(52) U.S. Cl.
CPC ...... *G06F 3/044* (2013.01); *G06F 2203/04111* (2013.01)

(58) Field of Classification Search
CPC ....... H05K 1/0298; G06F 3/044; G06F 3/0488
See application file for complete search history.

(56) References Cited

U.S. PATENT DOCUMENTS

2010/0001973 A1* 1/2010 Hotelling et al. ............ 345/174
2011/0115718 A1* 5/2011 Hsieh et al. .................. 345/173

FOREIGN PATENT DOCUMENTS

TW 201243676 A1 11/2012

* cited by examiner

*Primary Examiner* — Christopher E Leiby
(74) *Attorney, Agent, or Firm* — Rosenberg, Klein & Lee

(57) ABSTRACT

There is provided a single-layer capacitive touch sensor including a plurality of sensing units arranged in a matrix on a substrate. Each of the sensing units has a first electrode, a second electrode and a third electrode. The second electrode is arranged in a ring shape and electrically isolated from the first electrode, and the first electrode is located in an interior space of the ring shape. The third electrode is arranged outside of the interior space and electrically connected to the first electrode, wherein the second electrode of at least a part of the sensing units is configured to respectively form a mutual capacitance with the third electrode of two adjacent sensing units.

22 Claims, 8 Drawing Sheets

SINGLE LAYER CAPACITIVE TOUCH SENSOR

RELATED APPLICATIONS

The present application is based on and claims priority to Taiwanese Application Number 102125675, filed Jul. 17, 2013, the disclosure of which is hereby incorporated by reference herein in its entirety.

BACKGROUND

1. Field of the Disclosure

This disclosure generally relates to a touch sensor and, more particularly, to a single-layer capacitive touch sensor with reduced dead zones.

2. Description of the Related Art

The conventional touch sensor, for example a resistive touch sensor generally includes a two-layer structure (e.g. thin film electrodes) and a steady voltage is applied thereto. Spacers are inserted between the two layers to isolate the two layers from each other. When a user applies a pressure through a finger or a touch pen to a position on the two-layer structure, the two-layer structure is electrically conducted (i.e. short) at the position. Therefore, a control IC may calculate the position contacted by the user according to voltage variations of an electrically conducted position and transfer into a position signal to be sent to a host so as to accomplish a corresponding action or perform a predetermined command.

However, since the sensing mechanism of the resistive touch sensor is implemented by mechanical pressing, in order to improve the durability of the product, the soft material (e.g. PET films) of the resistive touch sensor for being pressed by the user should have characteristics of pressure resistant, anti-deformation, and wear resistant. Nevertheless, the light transmittance of the resistive touch sensor can degrade with the accumulation of usage time and frequencies of the product. Especially the abrasion is caused at specific areas such as frequent touched positions thereby reducing the conductivity of the thin film electrodes. In addition, in order to compensate for the disadvantage due to the low-transmittance material, a stronger backlight will be applied such that the power consumption of the whole device is increased as well.

Another capacitive touch sensor generates a mutual capacitance through the contact between a plurality of thin film electrodes and a finger of a user or a conductive object, and then detects capacitance variations thereof through a control IC to accordingly calculate contact positions. Compared with the resistive touch sensor, when the capacitive touch sensor is used, the user only needs to slightly touch rather than press with a fingertip such that the problem of sensitivity reducing due to the abrasion will not be generated. Therefore, the life time of the device can be extended. However, the conventional capacitive touch sensor is designed with at least 3 layers (e.g. an x-axis sensing layer, a y-axis sensing layer and a shielding layer) and more complex control ICs thereby having problems of reduced transmittance, increased thickness and high cost.

For simplifying the manufacturing process, the industry further provides a capacitive touch sensor technology having a single-layer structure to overcome the described disadvantages. However, with the increasing of the size and resolution of the touch device, the single-layer structure has a large number of sensing units and traces electrically connected to the sensing units. FIG. 1 is a schematic diagram of a conventional single-layer capacitive touch sensor. The single-layer capacitive touch sensor 9 includes a plurality of sensing units 90 arranged in a matrix on a substrate 92, wherein each sensing unit 90 is composed of a sensing electrode $E_S$ and a driving electrode $E_D$ and electrically connected to a trace 905. Then, the traces 905 are electrically connected to a control IC along a direction (e.g. the bottom of the substrate 92 as shown in FIG. 1). In the conventional design, the pattern design of every sensing unit 90 is the same to allow the predetermined capacitance of the sensing units to be the same in a passive way. Therefore, the trace area outside the sensing electrode $E_S$ and the driving electrode $E_D$ cannot be utilized efficiently to have the problem of dead zones being formed in the areas with traces. The dead zones may cause a plurality of sensing discontinuities of the touch sensor.

SUMMARY

Accordingly, the present disclosure provides a single-layer capacitive touch sensor that reduces the area ratio of dead zones by optimizing each sensing unit.

The present disclosure provides a single-layer capacitive touch sensor including a plurality of sensing units in which the sensing units are respectively optimized to efficiently increase the usable area of the single-layer capacitive touch sensor.

The present disclosure further provides a single-layer capacitive touch sensor including a plurality of sensing units in which the sensing units are arranged in a particular way to reduce the area of dead zones.

The present disclosure further provides a single-layer capacitive touch sensor whose single layer structure may improve the light transmittance and reduce the thickness and manufacturing cost.

The present disclosure provides a single-layer capacitive touch sensor. The capacitive touch sensor includes a plurality of first sensing units and a plurality of second sensing units arranged in a matrix on a substrate. Each of the first sensing units and each of the second sensing units include a first electrode, a second electrode and a third electrode. The second electrode is arranged in a ring shape and electrically isolated from the first electrode, and the first electrode is located in an interior space of the ring shape. The third electrode is arranged outside of the interior space and electrically connected to the first electrode, wherein the second sensing units further include at least one trace arranged outside of the interior space, and the at least one trace and the first electrode are respectively located at opposite sides of the third electrode.

The present disclosure further provides a single-layer capacitive touch sensor including a plurality of sensing regions formed on a substrate and repeatedly arranged along a first direction, wherein each of the sensing regions includes a first region and a second region extending in parallel along a second direction. The first region includes a plurality of first electrodes and a second electrode repeatedly arranged along the second direction, wherein the second electrode is arranged around each of the first electrodes and electrically isolated from the first electrodes. The second region includes a plurality of third electrodes and a plurality of traces extending along the second direction, wherein the third electrodes are electrically connected to the first electrodes respectively, and the traces and the first electrodes are located at opposite sides of the third electrodes.

The present disclosure further provides a single-layer capacitive touch sensor including a plurality of sensing units arranged in a matrix on a substrate. Each of the sensing units includes two first electrodes, a second electrode and a third electrode. The second electrode is arranged as two rings and electrically isolated from the two first electrodes, and each of the first electrodes is respectively located in an interior space of the rings. The third electrode is arranged outside of the interior space and electrically connected to the two first electrodes, wherein the second electrode of at least a part of the sensing units is configured to respectively form a mutual capacitance with the third electrode of two sensing units adjacent thereto.

In some embodiments, an electrode shape of the first electrode may be a square, a diamond, a circle, a comb or a ridge, and an inner margin of the second electrode may be complementary to the electrode shape of the first electrode.

In some embodiments, at least a part of the sensing units with the second electrode thereof respectively forming a mutual capacitance with the third electrode of two sensing units adjacent thereto are located at a marginal row or a center row of the matrix on the substrate.

In some embodiments, the third electrodes may have different areas. Preferably areas of the third electrodes of the sensing units arranged transversely are identical and areas of the third electrodes of the sensing units arranged longitudinally are identical.

The capacitive touch sensor according to the embodiment of the present disclosure may reduce the area of dead zones thereof through optimized design for each sensing unit. Accordingly, better sensing efficiency may be obtained thereby improving the touch experience of users.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

In the following descriptions, a single-layer capacitive touch sensor of the present disclosure is described with embodiments. However, the embodiment of the present disclosure is not limited to any particular environment, application or implementation. Therefore, the following descriptions of embodiments are for purpose of illustration only. It is understood that elements indirectly related to the present disclosure are omitted and not shown in the following embodiments and drawings.

Figure 2A:
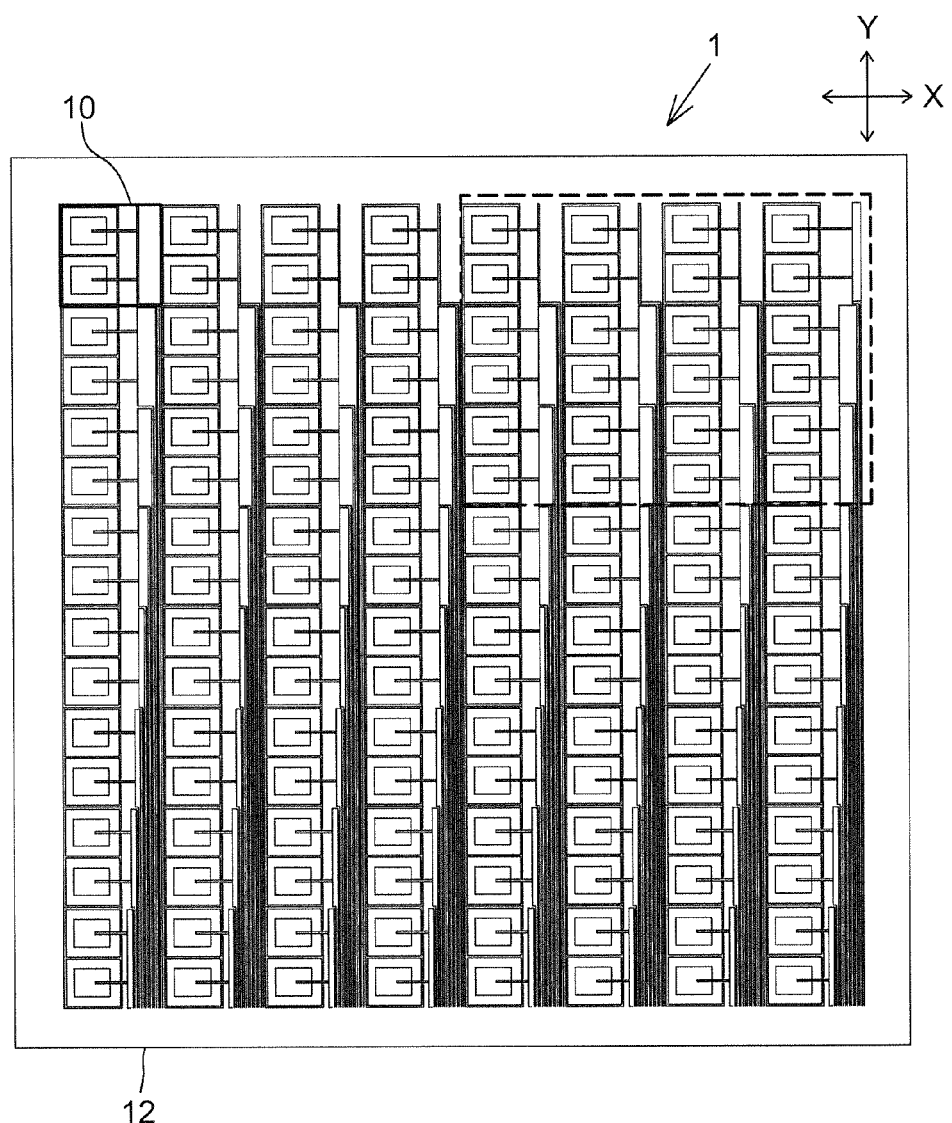
FIG. 2A is a schematic diagram of a single-layer capacitive touch sensor according to the first embodiment of the present disclosure.

FIG. 2A is a schematic diagram of a single-layer capacitive touch sensor 1 according to the first embodiment of the present disclosure. The touch sensor 1 includes a plurality of sensing units 10, and the sensing units 10 are arranged in a matrix on a substrate 12. A user (not shown) may contact with the sensing units 10 through a finger or a touch pen to generate an induced capacitance. And a control IC (not shown) may generate a position signal according to the induced capacitance to a host to accomplish a corresponding action or perform a predetermined command.

It should be mentioned that since a touch sensor may be attached to a display device to be operated by a user, the sensing units 10 of the touch sensor 1 are preferably arranged as a rectangle to match the shape of the display device, but the present disclosure is not limited thereto. The arrangement of the sensing units 10 may be determined according to the shape of different display devices.

Figure 2B:
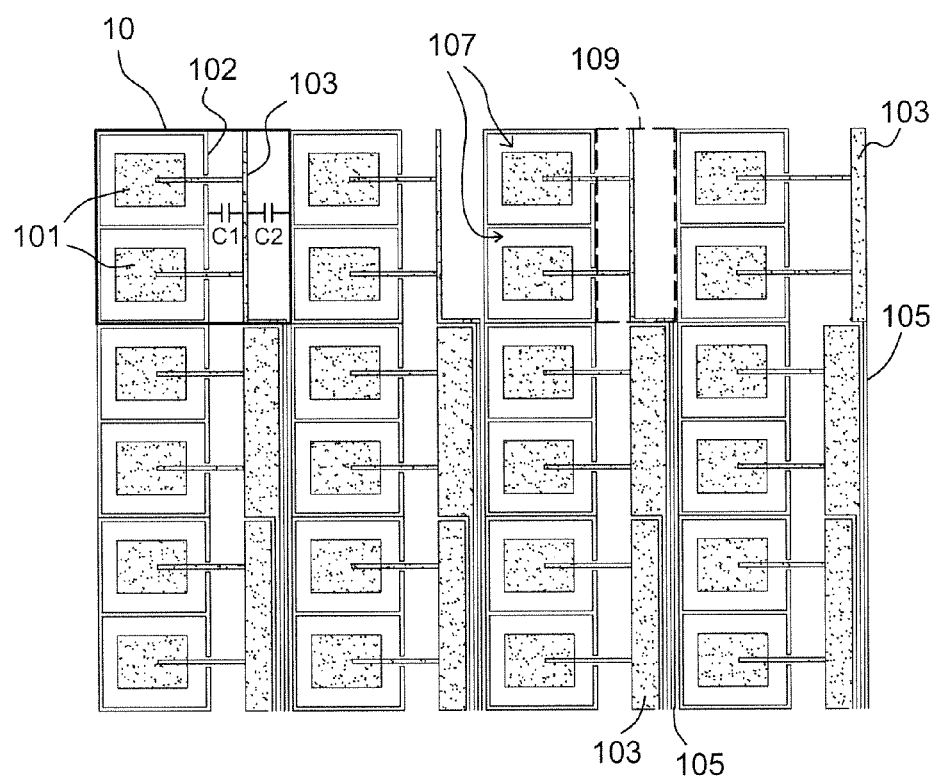
FIG. 2B is a partially enlarged view of the single-layer capacitive touch sensor of FIG. 2A.

Please referring to FIGS. 2A and 2B at the same time, FIG. 2B is a partially enlarged diagram of the region within the dotted line in FIG. 2A. Each of the sensing units 10 includes two first electrodes 101, a second electrode 102 and a third electrode 103, wherein the second electrode 102 may be arranged as two rings and electrically isolated from the first electrodes 101, and each of the first electrodes 101 is respectively located in an interior space 107 of the rings. The third electrode 103 is arranged in an exterior space 109 outside of the interior space 107 and electrically connected to the two first electrodes 101. It should be mentioned that although FIGS. 2A and 2B show that each of the sensing units 10 includes two first electrodes 101, but the present disclosure is not limited thereto. In other embodiments, each of the sensing units 10 may include a first electrode 101, a second electrode 102 disposed around the first electrode 101 and a third electrode 103 disposed outside of the second electrode 102.

In the present embodiment, the first electrode 101 and the third electrode 103 may be served as diving electrodes and the second electrode 102 may be served as a sensing electrode. Therefore, when a driving voltage is applied to the driving electrode through a trace 105, a predetermined capacitance may be formed between the first electrode 101 and the second electrode 102, wherein each of the traces 105 is respectively electrically connected to the third electrodes 103 and extended toward a side of the substrate 12 (e.g. the bottom of the substrate 12) so as to connect to a control IC (not shown). In other embodiments, the first electrode 101 and the third electrode 103 may be served as sensing electrodes and the second electrode 102 may be served as a driving electrode. The principle of the capacitive touch sensor is well known to those skilled in the art and thus details thereof are not described herein. The present disclosure is to reduce the area of dead zones through designing the arrangement of electrodes in the sensing units 10.

Figure 1:
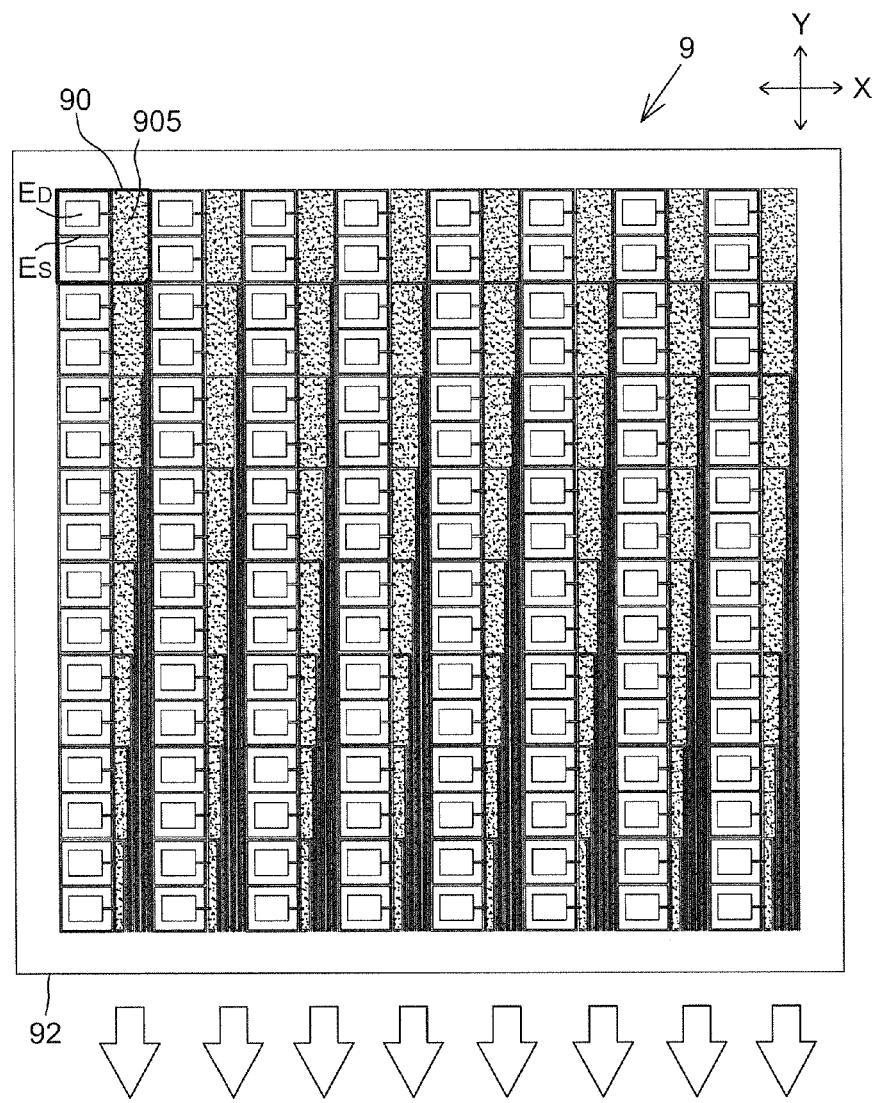
FIG. 1 is a schematic diagram of a conventional single-layer capacitive touch sensor.

It should be mentioned that the prior art is to fill up the exterior space 109 with a plurality of traces 105, as shown in FIG. 1. The difference between the present disclosure and the prior art is that the plurality of traces 105 in the present disclosure are arranged to have identical line widths or have appropriate individual line widths, and the third electrodes 103 with different areas are further arranged in the exterior space 109 so that a mutual capacitance (e.g. C1 in FIG. 2B) may be formed due to an appropriate distance between the third electrode 103 and the second electrode 102, wherein the appropriate distance may be different according to the product specification such as referring to the driving voltage applied by the driving electrodes. Besides, if there is no trace 105 of the sensing unit 10 next to the side edge of the third electrode 103 (e.g. the sensing units 10 in the first row), the third electrode 103 may also form another mutual capacitance (e.g. C2 in FIG. 2B) with the second electrode 102 of adjacent sensing unit 10 due to an appropriate distance. Therefore, in a part of the sensing units 10, not only the predetermined capacitance may be formed between the first electrode 101 and the second electrode 102, but the third electrode 103 may respectively form a mutual capacitance with the second electrodes 102 of the same sensing unit 10 and adjacent sensing unit 10 thereby reducing the area of dead zones. In other embodiments, the third electrodes 103 of all sensing units 10 may have the same areas as long as the third electrode 103 may form a mutual capacitance with the second electrode 102 of the same sensing unit 10.

Except the sensing units 10 at the first row, since other sensing units 10 have the trace 105 that is not electrically connected to the third electrode 103 thereof and the traces 105 are connected to a predetermined voltage thereby forming an electrostatic shielding to adjacent sensing units 10, positions of the traces 105 in the present embodiment still form dead zones. In addition, in the present application since the sensing units 10 at the first row on the substrate 12 do not include the trace 105, the second electrode 102 of the sensing units 10 at the first row may be configured to respectively form mutual capacitances C1 and C2 with the third electrode 103 of two sensing units 10 adjacent thereto at the same time, as shown in FIG. 2B. Therefore, the sensing units 10 at the first row in the present embodiment have no dead zone to accordingly reduce the area of dead zones.

That is to say, in the present disclosure the sensing units 10 include a plurality of first sensing units 10A and a plurality of second sensing units 10B, wherein the first sensing units 10A have no trace 105 and the second sensing units 10B have the plurality of traces 105.

Figure 3A:
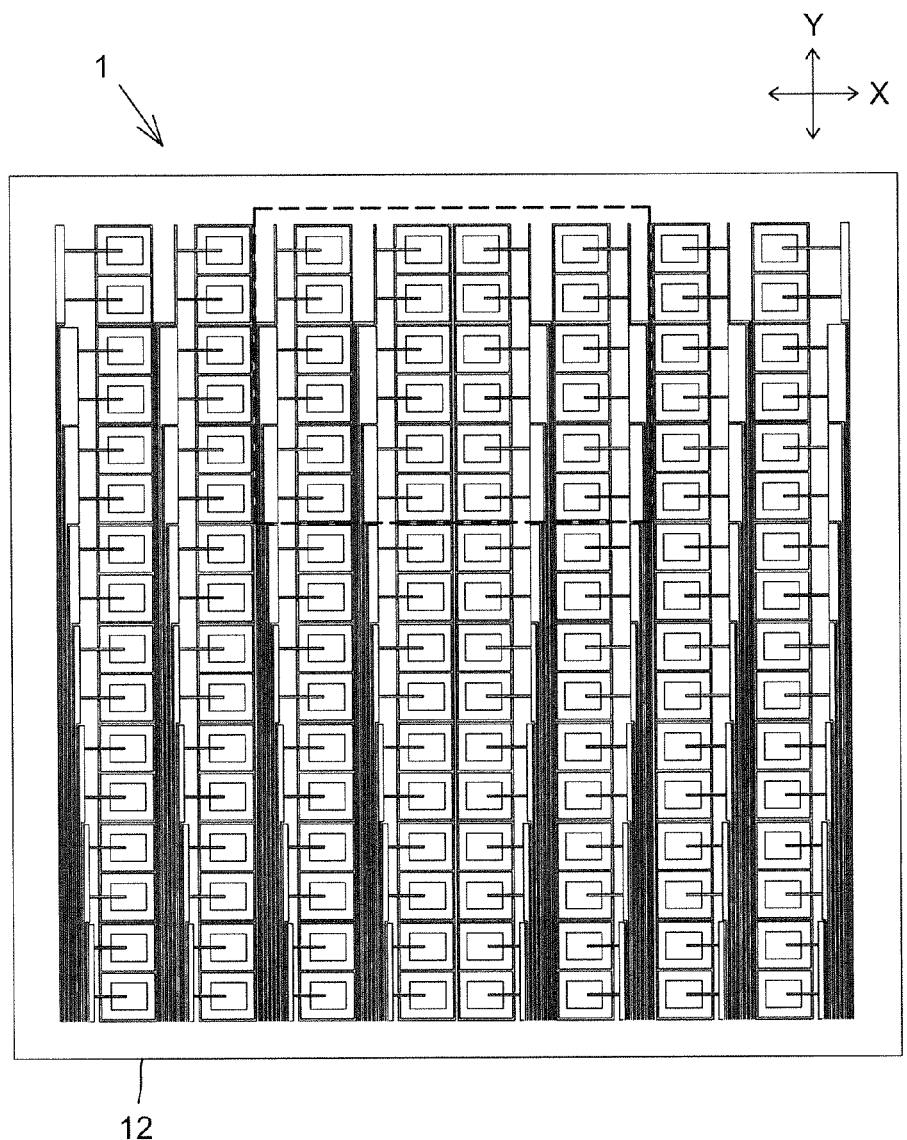
FIG. 3A is a schematic diagram of a single-layer capacitive touch sensor according to the second embodiment of the present disclosure.
Figure 3B:
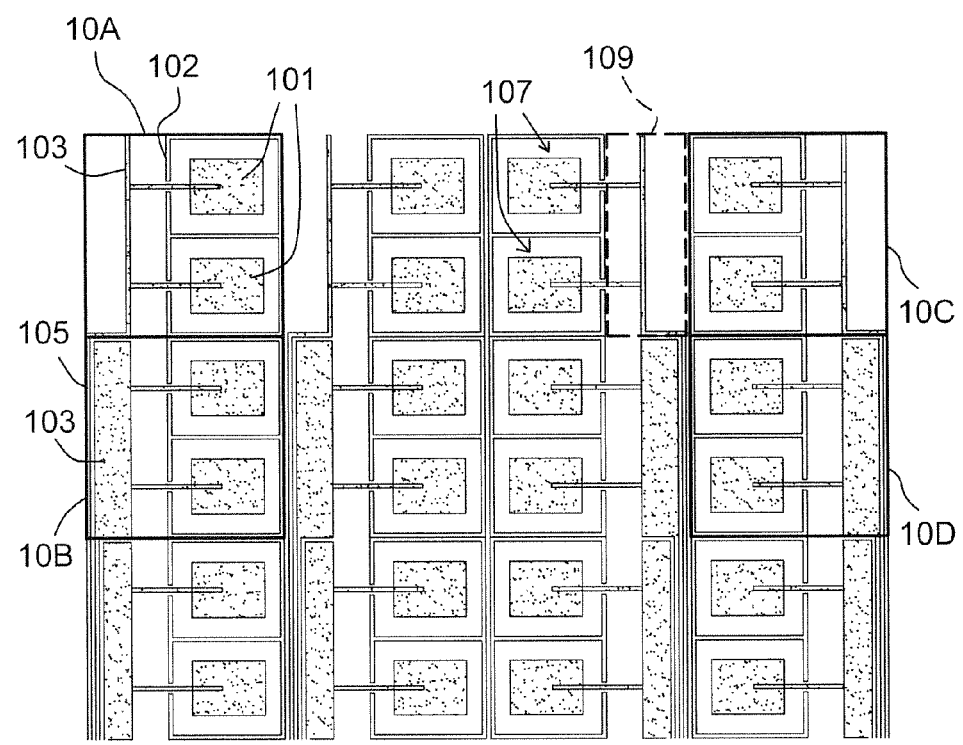
FIG. 3B is a partially enlarged view of the single-layer capacitive touch sensor of FIG. 3A.

Please referring to FIGS. 3A and 3B at the same time, FIG. 3A is a schematic diagram of a single-layer capacitive touch sensor 1 according to the second embodiment of the present disclosure; and FIG. 3B is a partially enlarged diagram of the region within the dotted line in FIG. 3A. The touch sensor 1 includes a plurality of first sensing units 10A and a plurality of second sensing units 10B arranged in a matrix on a substrate 12, wherein the sensing units including at least one trace 105 are referred to the second sensing units 10B. Each of the first sensing units 10A and each of the second sensing units 10B both have at least a first electrode 101 (two first electrodes being shown herein), a second electrode 102 and a third electrode 103, wherein the second electrode 102 is arranged in a ring shape as well and electrically isolated from the two first electrodes 101, and the first electrodes 101 are located in an interior space 107 of the ring and configured to form a mutual capacitance between the first electrode 101 and the second electrode 102. The third electrode 103 is arranged outside of the interior space 107 and electrically connected to the first electrode 101.

Similarly, the first electrode 101 and the third electrode 103 may be served as driving electrodes and the second electrode 102 may be served as a sensing electrode. As shown in FIG. 3B, the third electrode 103 is electrically connected to a trace 105 to obtain a driving voltage. The second sensing units 10B further include at least one trace 105 arranged outside of the interior space 107, and the at least one trace 105 and the first electrode 101 are located at opposite sides of the third electrode 103. The third electrode 103 of the first sensing units 10A may be electrically connected to the trace 105 of the second sensing unit 10B adjacent thereto. Therefore, the first sensing units 10A may have no trace 105 extending along a second direction (e.g. the Y direction shown in FIG. 3A).

It should be mentioned that the first electrode 101, the second electrode 102 and the third electrode 103 of each first sensing unit 10A and each second sensing unit 10B may be repeatedly or reversely arranged along a first direction (e.g. the X direction as shown in FIG. 3A). For example as shown in FIG. 3B, the second electrode 102 of the first sensing unit 10A is shown to have an opening toward left. Or, the first sensing unit 10A may be horizontally reversed to be referred to another sensing unit 10C such that the opening of the first sensing unit 10C faces right. Similarly, the second sensing unit 10B may also be horizontally reversed to be referred to another second sensing unit 10D. More specifically speaking, in the embodiment of the present disclosure the pattern of each sensing unit 10 is formed based on the arrangement of the first electrode 101, the second electrode 102 and the third electrode 103. Therefore, the repeatedly or reversely arrangement described above is referred to the pattern formed by the arrangement of the electrodes being repeatedly or reversely arranged.

FIG. 3A exemplarily shows a preferable matrix arrangement, wherein the sensing units 10 at the first row are shown to have 4 first sensing units 10A and 4 first sensing units 10C from left to right, and the sensing units 10 at the second row to the last row are shown to have 4 second sensing units 10B and 4 second sensing units 10D from left to right. Therefore, the openings of the sensing units 10 located in the left half region and the right half region of the substrate 12 respectively face the left and right side of the substrate 12. That is, the opening of the first sensing unit 10A faces the left side of the substrate 12, the opening of the first sensing unit 10C faces the right side of the substrate 12, the opening of the second sensing unit 10B faces the left side of the substrate 12, and the opening of the second sensing unit 10D faces the right side of the substrate 12. More specifically, the sensing units 10 located in the left and right half regions of the substrate 12 may have opposite patterns of the electrode arrangement.

Figure 3C:
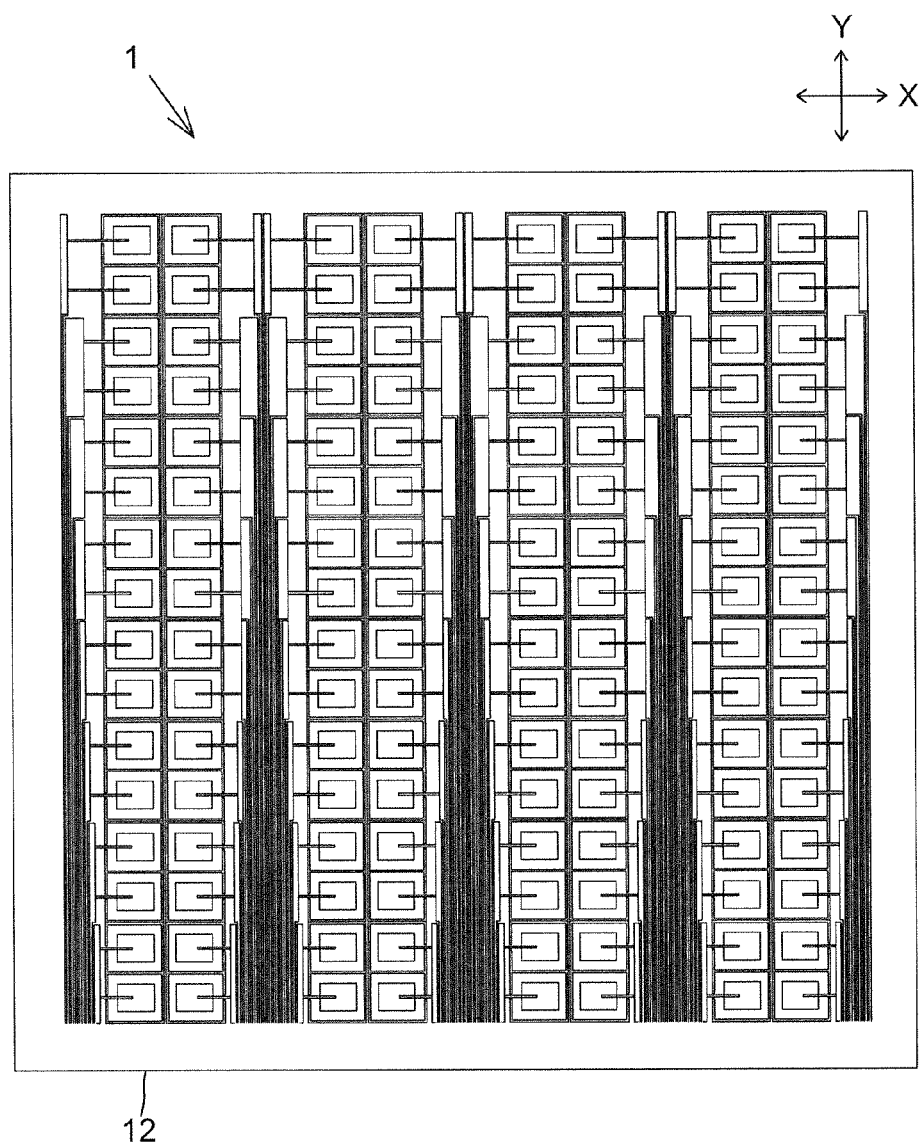
FIG. 3C is a schematic diagram of another matrix arrangement of the single-layer capacitive touch sensor according to the second embodiment of the present disclosure.

Since the openings of the second sensing units 10B face the left side, all traces 105 in the second sensing units 10B are also located at the left side of the third electrodes 103. Therefore, the trace area of the second sensing units 10B at the left and right margin of the substrate 12 may be excluded from an active area according to this matrix arrangement so as to reduce an area ratio of the dead zones versus the whole active area. In the present embodiment, as long as the trace areas of the second sensing units 10B at the two margins in the touch sensor 1 are located at the margins of the substrate 12, the sensing units 10 except those of the two marginal columns may also be arranged reversely. For example, FIG. 3C is a schematic diagram of another matrix arrangement of the single-layer capacitive touch sensor 1 according to the second embodiment of the present disclosure in which the traces of the sensing units of the left most column and the right most column in the touch sensor 1 are respectively located at the left and right side of the substrate 12, and the arrangement of the sensing units in center columns has no particular limitation. In this way, the effect of the present disclosure may still be achieved.

On the other hand, please referring to FIG. 3C, a trace number included in the second sensing units 10B/10D may monotonically increase along a second direction (e.g. the Y direction shown in FIG. 3C). For example, the first one of the second sensing unit 10B located below the first sensing unit 10A in the first column at the left side of the substrate 12 has one trace 105, the second one of the second sensing unit 10B located below the first sensing unit 10A in the first column at the left side of the substrate 12 has two traces 105, and so on. That is to say, each column located on the substrate 12 is composed of a first sensing unit 10A/10C and a plurality of second sensing units 10B/10D. Therefore, the sensing units 10 of each column may be referred to a sensing region, as shown in FIG. 3D.

Figure 3D:
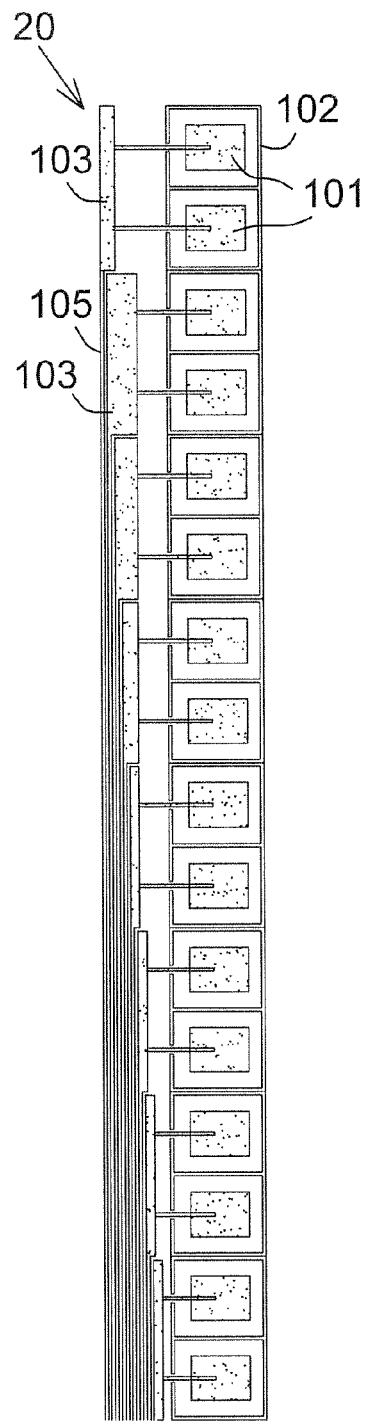
FIG. 3D is a schematic diagram of a sensing region in the single-layer capacitive touch sensor according to the embodiment of the present disclosure.

FIG. 3D is a schematic diagram of a sensing region 20 in the single-layer capacitive touch sensor according to the present disclosure, wherein the sensing region 20 is composed of a first sensing unit 10A and a plurality of second sensing units 10B. It is appreciated that a trace number included in the second sensing units 10B monotonically increases from top to bottom along the Y direction. Therefore, the area of dead zones corresponding to the traces becomes larger correspondingly.

In another embodiment, in order to further reduce the area of dead zones, the arrangement of the sensing units in the sensing region 20 may be changed.

Figure 3E:
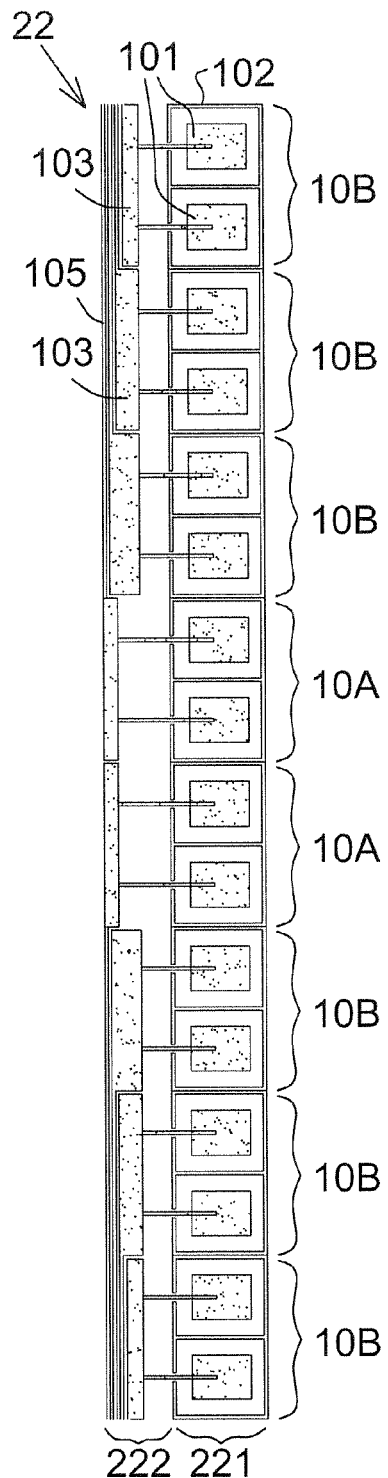
FIG. 3E is a schematic diagram of another sensing region in the single-layer capacitive touch sensor according to the embodiment of the present disclosure.

FIG. 3E is a schematic diagram of another sensing region 22 in the single-layer capacitive touch sensor according to the embodiment of the present disclosure, wherein the center of the sensing region 22 has two first sensing units 10A and a plurality of second sensing units 10B are laid at two sides along the Y direction. Compared with the sensing region 20 of FIG. 3D, the extension distance of the traces in the sensing region 22 is reduced by adding a new extension direction of traces (upwards). Therefore, the area of dead zones may be reduced efficiently. It should be mentioned that the sensing region 22 only exemplary shows a preferable arrangement, wherein the first sensing units 10A may be laid at other positions as well according to different implementations (e.g. a frequent touched region of the substrate 12) and are not limited to be located at two margins or the center of the substrate 12.

Figure 4:
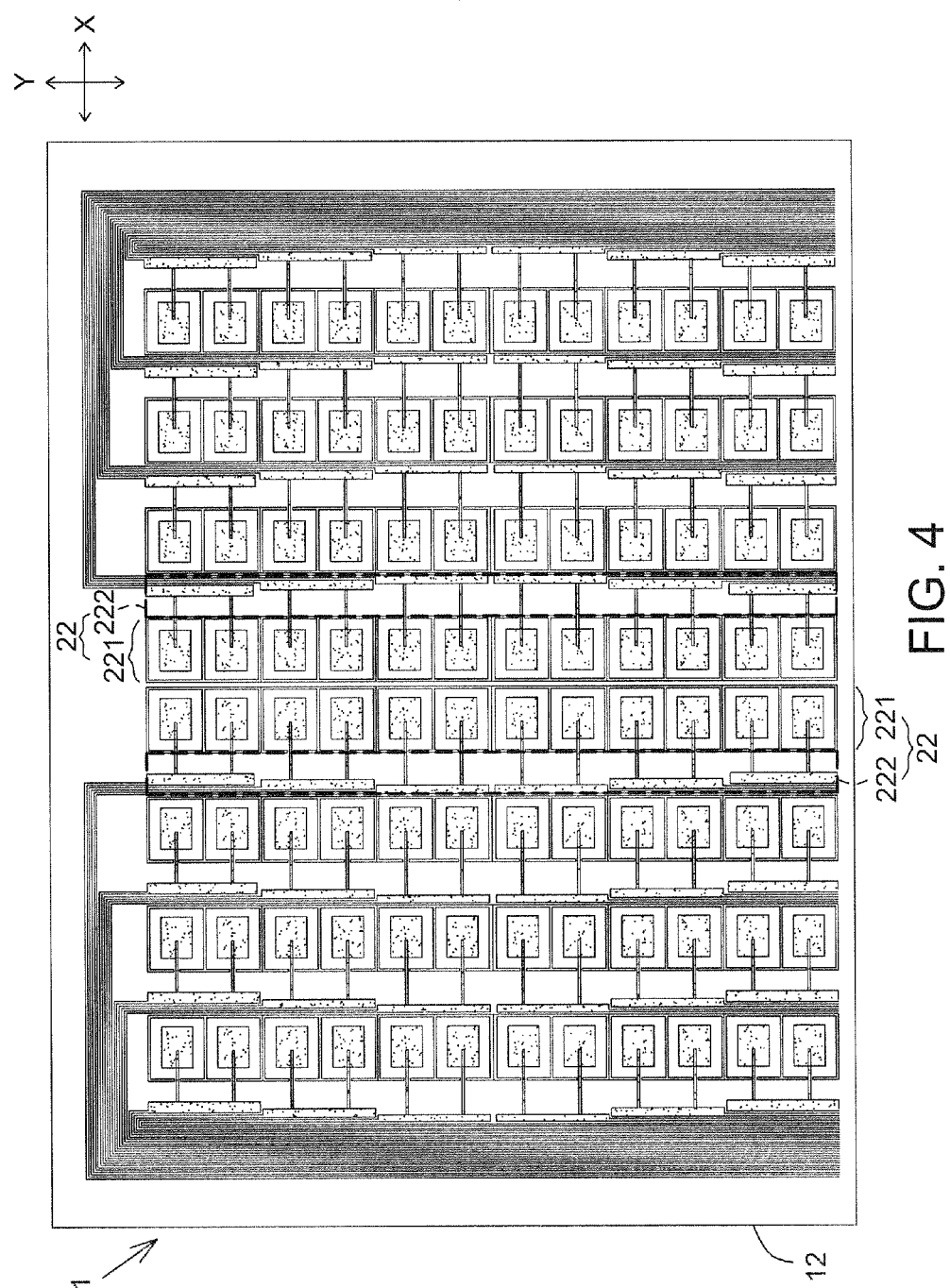
FIG. 4 is a schematic diagram of a single-layer capacitive touch sensor according to the third embodiment of the present disclosure.

FIG. 4 is a schematic diagram of a single-layer capacitive touch sensor 1 according to the third embodiment of the present disclosure. The touch sensor 1 includes a plurality of sensing regions 22 formed on a substrate 12 and repeatedly arranged along a first direction, wherein each of the sensing regions 22 includes a first region 221 and a second region 222 extending in parallel along a second direction (e.g. the Y direction). It should be mentioned that the repeatedly arranged sensing regions 22 may also include horizontally reversed sensing regions 22 that are similar to the second embodiment in the present disclosure (e.g. FIGS. 3A and 3C) and thus details thereof are not described herein.

The first region 221 includes a plurality of first electrodes 101 and a second electrode 102 repeatedly arranged along the second direction, wherein the second electrode 102 is arranged around each of the first electrodes 101 and electrically isolated from the first electrodes 101 so as to form a mutual capacitance between the first electrode 101 and the second electrode 102. The second region 222 includes a plurality of third electrodes 103 and a plurality of traces 105 extending along the second direction, wherein the third electrodes 103 are electrically connected to the first electrodes 101 respectively and the traces 105 and the first electrodes 101 are located at opposite sides of the third electrodes 103. According to this structure, the first sensing units 10A are located at the center two rows of the sensing unit matrix, and the third electrode 103 of the first sensing units 10A may respectively form a mutual capacitance with the second electrode 102 of two adjacent sensing units 10A along the first direction. The second sensing units 10B are located at sensing-unit rows except the center rows, and as the second sensing units 10B have the traces 105, the third electrode 103 thereof cannot respectively form a mutual capacitance with the second electrode 102 of the second sensing units 10B adjacent thereto.

In the above embodiments, an electrode shape of the first electrode 101 may be a square, a diamond, a circle, a comb or a ridge, and an inner margin of the second electrode 102 may be complementary to the electrode shape of the first electrode 101 thereby forming a uniform mutual capacitance. Besides, the second electrode 12 is not limited to be arranged as a ring shape with only one opening. The second electrode 102 may also be arranged as a shape having a plurality of openings corresponding to a plurality of first electrodes 101.

Since the capacitive touch sensor of the present disclosure only has a single-layer structure, the first electrode 101, the second electrode 102, the third electrode 103 and traces 105 in the above embodiments are transparent conductive films such as indium tin oxide (ITO). Besides, the electrodes and the traces 105 are formed on a substrate 12 such as a glass substrate, a plastic substrate or a flexible substrate, and the substrate may be further attached to a display unit to form a touch sensing device, wherein the display unit may be a liquid crystal display unit or an organic light emitting diode (OLED) display unit.

As mentioned above, the conventional single-layer capacitive touch sensor composed of sensing units having the same pattern design may not efficiently utilize the trace area thereof thereby having the problem of sensing discontinuities. Therefore, the present disclosure further provides a single-layer capacitive touch sensor that may optimize each sensing unit thereby efficiently reducing the area of dead zones thereof. Accordingly, better sensing efficiency may be obtained and touch experience of users may be improved.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:
1. A capacitive touch sensor, comprising:
a plurality of first sensing units and a plurality of second sensing units arranged in a matrix on a substrate, and each of the first sensing units and each of the second sensing units comprising:
a pair of directly adjacent first electrodes;
a second electrode arranged around each of said first electrodes and electrically isolated from each of the first electrodes, and each of the pair of directly adjacent first electrodes being located in an interior space bounded by two transverse parts and two longitudinal parts of said second electrode, wherein a portion of the second electrode between the pair of directly adjacent first electrodes and bounding both the pair of directly adjacent first electrodes is a same transverse part of the second electrode, and one of the two longitudinal parts of the second electrode bounding each of the first electrodes has an opening; and
a third electrode arranged outside of the interior space and directly connected to each of the first electrodes via the openings, wherein the third electrode of the first sensing unit is isolated from the third electrode of the second sensing unit;
wherein in each of the second sensing units a trace of the first sensing unit and the first electrodes of the second sensing units are respectively located at opposite sides of the third electrode of the second sensing units, and
in the plurality of first sensing units and a section of second sensing units among the plurality of second sensing units, the trace of the first sensing unit in the section of the second sensing units is directly connected with the third electrode in the plurality of first sensing units, wherein the section of the second sensing units is directly adjacent to the plurality of first sensing units, and the trace of the first sensing unit directly contacts with one of a plurality of third electrodes of the first sensing units and is not electrically in contact with any other third electrode.

2. The capacitive touch sensor as claimed in claim 1, wherein the substrate is a glass substrate, a plastic substrate or a flexible substrate; and
the first electrode, the second electrode and the third electrode are transparent conductive films.

3. The capacitive touch sensor as claimed in claim 1, wherein the first electrode and the third electrode are configured as driving electrodes and the second electrode is configured as a sensing electrode; or the first electrode and the third electrode are configured as sensing electrodes and the second electrode is configured as a driving electrode.

4. The capacitive touch sensor as claimed in claim 1, wherein the third electrodes of the first sensing units and the third electrodes of the second sensing units have different areas each with respect to the other.

5. The capacitive touch sensor as claimed in claim 1, wherein the first sensing units are located at a marginal row or a center row of the matrix on the substrate.

6. The capacitive touch sensor as claimed in claim 1, wherein the first electrode, the second electrode and the third electrode of each of the first sensing units and each of the second sensing units are repeatedly or reversely laid along a first direction.

7. The capacitive touch sensor as claimed in claim 1, wherein a trace number in the second sensing units monotonically increases along a second direction, or the second sensing units closer to two sides along the second direction have a higher trace number.

8. The capacitive touch sensor as claimed in claim 1, wherein an electrode shape of the first electrode is a square, a diamond, a circle, a comb or a ridge, and an inner margin of the second electrode is complementary to the electrode shape of the first electrode.

9. The capacitive touch sensor as claimed in claim 1, wherein the third electrode is within a predetermined distance from the second electrode.

10. The capacitive touch sensor as claimed in claim 1, wherein the openings of the second electrode of the first sensing units and the second sensing units all face in a same direction.

11. The capacitive touch sensor as claimed in claim 1, wherein the trace is configured to transmit a driving voltage and the third electrode is configured to form mutual capacitance with the second electrode, and there is no trace between two adjacent first sensing units at two opposite sides of the third electrode.

12. A capacitive touch sensor, comprising:
a plurality of sensing regions formed on a substrate and repeatedly arranged along a first direction, wherein each of the sensing regions comprises a first region and a second region extending in parallel along a second direction, wherein
the first region comprises a plurality of pairs of directly adjacent first electrodes and a second electrode repeatedly arranged along the second direction, wherein the second electrode is arranged around each of the first electrodes and electrically isolated from the first electrodes, and each of the pair of directly adjacent first electrodes being located in an interior space bounded by two first parts of the second electrode along the first direction and two second parts of the second electrode along the second direction, wherein a portion of the second electrode between the pair of directly adjacent first electrodes and bounding both the pair of directly adjacent first electrodes is a same first part of the second electrode;
the second region comprises a plurality of third electrodes and a plurality of traces, the plurality of third electrodes extending along the second direction in a first section and a second section of the second region, and the plurality of traces extending along the second direction in the first section of the second region but not arranged in the second section of the second region, and one of the plurality of traces in the first section is directly connected with the third electrode in the second section of the second region but not electrically in contact with any other third electrode,
the third electrodes are directly connected to the first electrodes respectively,
the traces in the first section of the second region and the first electrodes are located at opposite sides of the third electrodes in the first section of the second region, and
the third electrode in the second section of the second region is configured to form mutual capacitance with both second electrodes in two first regions adjacent to the second section of the second region where the third electrode is located.

13. The capacitive touch sensor as claimed in claim 12, wherein the substrate is a glass substrate, a plastic substrate or a flexible substrate; and the first electrode, the second electrode and the third electrode are transparent conductive films.

14. The capacitive touch sensor as claimed in claim 12, wherein the first electrode and the third electrode are configured as driving electrodes and the second electrode is configured as a sensing electrode; or the first electrode and the third electrode are configured as sensing electrodes and the second electrode is configured as a driving electrode.

15. The capacitive touch sensor as claimed in claim 12, wherein the third electrodes in the second section of the second region and the third electrodes in the first section of the second region have different areas each with respect to the other along the second direction.

16. The capacitive touch sensor as claimed in claim 12, wherein the first regions of two adjacent sensing regions are adjacent to each other or separated by one of the second regions.

17. The capacitive touch sensor as claimed in claim 12, wherein a trace number of the traces monotonically increases along the second direction, or two sides along the second direction of the substrate have a higher trace number.

18. The capacitive touch sensor as claimed in claim 12, wherein an electrode shape of the first electrode is a square, a diamond, a circle, a comb or a ridge, and an inner margin of the second electrode is complementary to the electrode shape of the first electrode.

19. The capacitive touch sensor as claimed in claim 12, wherein the third electrodes are within a predetermined distance from the second electrodes.

20. A capacitive touch sensor, comprising:
a plurality of sensing units arranged in a matrix on a substrate, and each of the sensing units comprising:
two directly adjacent first electrodes;
a second electrode positioned around each of the directly adjacent first electrodes and electrically isolated from the two first electrodes, and each of the two directly adjacent first electrodes respectively located in an interior space bounded by two transverse parts and two longitudinal parts of said second electrode, wherein a portion of the second electrode between the two directly adjacent first electrodes and bounding both the two directly adjacent first electrodes is a same transverse part of the second electrode; and
a third electrode arranged outside of the interior space, and the two first electrodes in the interior space being directly connected to the same third electrode;
wherein first mutual capacitance is formed between the two first electrodes and the second electrode, and
second mutual capacitance is respectively formed between the second electrode of at least a part of the sensing units and the third electrodes of two sensing units directly adjacent to the second electrode of the at least a part of the sensing units,
wherein each of the sensing units not forming the second mutual capacitance between the second electrode therein and two adjacent third electrodes further comprises at least one trace arranged outside of the interior space and separated from the third electrode therein, and the at least one trace directly in contact with one of a plurality of third electrodes of the plurality of sensing units is not electrically in contact with any other third electrode, said at least one trace and the first electrodes are respectively located on opposite sides of the third electrode.

21. The capacitive touch sensor as claimed in claim 20, wherein the at least a part of the sensing units are located at a marginal row or a center row of the matrix on the substrate.

22. The capacitive touch sensor as claimed in claim 20, wherein the third electrodes of a part of sensing units among the plurality of sensing units have different areas each with respect to the other and the third electrodes are within a predetermined distance from the second electrodes.

* * * * *